United States Patent
Ami et al.

(10) Patent No.: US 11,051,184 B1
(45) Date of Patent: Jun. 29, 2021

(54) SELF-OPTIMIZING NETWORKS FOR NARROWBAND INTERNET-OF-THINGS (IOT) APPLICATIONS

(71) Applicant: Cisco Technology, Inc., San Jose, CA (US)

(72) Inventors: Alon Ben Ami, Gedera (IL); Tal Shraga Dunsky, Kadima (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 142 days.

(21) Appl. No.: 16/278,789

(22) Filed: Feb. 19, 2019

(51) Int. Cl.
*H04W 24/02* (2009.01)
*H04W 4/70* (2018.01)
*H04W 88/08* (2009.01)
*H04L 29/08* (2006.01)

(52) U.S. Cl.
CPC ............ *H04W 24/02* (2013.01); *H04W 4/70* (2018.02); *H04L 67/12* (2013.01); *H04W 88/08* (2013.01)

(58) Field of Classification Search
CPC ....... H04W 24/02; H04W 4/70; H04W 88/08; H04L 67/12
See application file for complete search history.

(56) References Cited

U.S. PATENT DOCUMENTS

| | | | |
|---|---|---|---|
| 9,332,458 B2* | 5/2016 | Nuss | H04W 28/0247 |
| 2015/0155996 A1* | 6/2015 | Garcia | H04W 72/082 |
| | | | 370/329 |
| 2017/0026852 A1* | 1/2017 | Jalden | H04W 16/28 |
| 2019/0261197 A1* | 8/2019 | Bellamkonda | H04W 24/04 |

OTHER PUBLICATIONS

Vlad-Ioan Bratu, "Self-optimization of Antenna Tilt in Mobile Networks", Master of Science Thesis performed at the Radio Communication Systems Group, KTH, Examiner: Professor Slimane Ben Slimane, Supervisor: Professor Claes Beckman, Jun. 2012, 68 pages.
Genis Sanchez, "3GPP NB-IOT Deployment and Optimization Challenges", https://blog.viavisolutions.com/2017/12/18/3gpp-nb-iot-deployment-and-optimization-challenges/, Dec. 18, 2017, 4 pages.
Keysight Technologies, "Operator Cuts Network Optimization Time by 50%", http://literature.cdn.keysight.com/itweb/pdf/5992-3111EN.pdf, Jul. 2, 2018, 3 pages.
Transcom Instruments, "Application of Scanner in the Optimization and Maintenance of NB-IoT Network", https://www.transcomwireless.com/wp-content/uploads/2018/06/Application-of-Scanner-in-the-Optimization-and-Maintenance-of-NB-IoT-Network.pdf, Jun. 7, 2018, 9 pages.

* cited by examiner

*Primary Examiner* — Siming Liu
(74) *Attorney, Agent, or Firm* — Edell, Shapiro & Finnan, LLC

(57) ABSTRACT

Techniques for adapting Self-Optimizing Networking (SON) applications for Narrowband Internet-of-Things (NB-IoT) deployments in wireless networks. A controller is provided for a wireless network that includes a plurality of base stations. At least one of the base stations serving wireless communication for both a first cell type of wireless user devices and a second cell type of NB-IoT devices. The controller applies SON applications to the wireless network, and monitors performance of wireless communication in the first cell type and the second cell type associated with one or more base stations affected by the SON applications. The controller modifies or reverts the actions taken by the SON applications on the wireless network based on the performance monitoring.

20 Claims, 10 Drawing Sheets

# SELF-OPTIMIZING NETWORKS FOR NARROWBAND INTERNET-OF-THINGS (IOT) APPLICATIONS

TECHNICAL FIELD

This disclosure relates to providing wireless service for Internet-of-Things (IoT) applications.

BACKGROUND

The introduction of Narrowband IoT (NB-IoT) devices in wireless wide area networks (WWAN), particularly in In-band and Guard-band NB-IoT deployments, creates mutual influence with existing WWAN deployments that serve user equipment (UE) devices, such as in a Long Term Evolution (LTE)/Fourth Generation (4G) network. Self-Optimizing Network (SON) applications are used to automatically adapt to changes in WWANs. System operators will be looking to use SON applications in WWANs that serve a mix of UE devices as well as NB-IoT devices.

As NB-IoT is a relatively new technology, generally deployed as a new layer on top of an existing WWAN technology, e.g. LTE, existing SON applications, originally built for the existing technology, should be adjusted to take both technologies into account when making decisions on actions they take on the wireless network, and to monitor both technologies when testing those actions before committing or reverting them. As these technologies are mutually influential and share system resources, the adjustment involves techniques not heretofore known or contemplated.

DESCRIPTION OF EXAMPLE EMBODIMENTS

Overview

Presented herein are techniques for adapting SON applications for Narrowband Internet-of-Things (NB-IoT) deployments in wireless networks. A controller is provided for a wireless network that includes a plurality of base stations. At least one of the base stations serves wireless communication for both a first cell type of wireless user devices and a second cell type of NB-IoT devices. The controller applies a SON application to the wireless network, and monitors performance of wireless communication in the first cell type and the second cell type associated with one or more base stations affected by the SON application. The controller modifies or reverts the actions taken by the SON application on the wireless network based on the performance monitoring.

EXAMPLE EMBODIMENTS

With the presence of Narrowband Internet-of-Things (NB-IoT) devices in wireless wide area networks (WWANs), Self-Optimizing Network (SON) applications should take into account the presence and characteristics of the NB-IoT deployments, so as not to inadvertently cause damage when performing optimization changes to the WWAN.

NB-IoT can be applied in one of three ways:

1. In-band—NB-IoT is deployed within a frequency band (e.g., LTE band) and occupies one (or more) of its physical resource blocks (PRBs).

2. Guard-band—NB-IoT is deployed in the guard band between two adjacent frequency bands.

3. Standalone—NB-IoT is deployed in a dedicated spectrum.

The first two types (In-band and Guard-band) cause concern for existing SON applications, as in these two deployment types, NB-IoT is anchored on a base station that shares its resources, such as transmit power and antenna, with standard/normal wireless service, such as for user equipment (UE) devices. In other words, a given base station serves communication for both a first cell type of wireless UE devices (also called an "LTE cell" or "4G cell" herein) and a second cell type of NB-IoT devices (also called an "NB-IoT cell" herein). It should be understood that the techniques presented herein are not limited to any particular wireless communication system or standard, and can be used with connection with any type of wireless network/communication system standard now known (e.g., 4G, LTE/4G, 5G) or hereinafter developed.

NB-IoT also has different coverage characteristics than those of LTE/4G, etc. NB-IoT is designed for deep coverage, with a maximum coupling loss (MCL) that can exceed that of LTE/4G by more than 20 dB. Accordingly, presented herein are techniques for adapting SON applications to the presence of NB-IoT using an In-band or Guard-band deployment and the mutual influence between NB-IoT and LTE.

Figure 1:
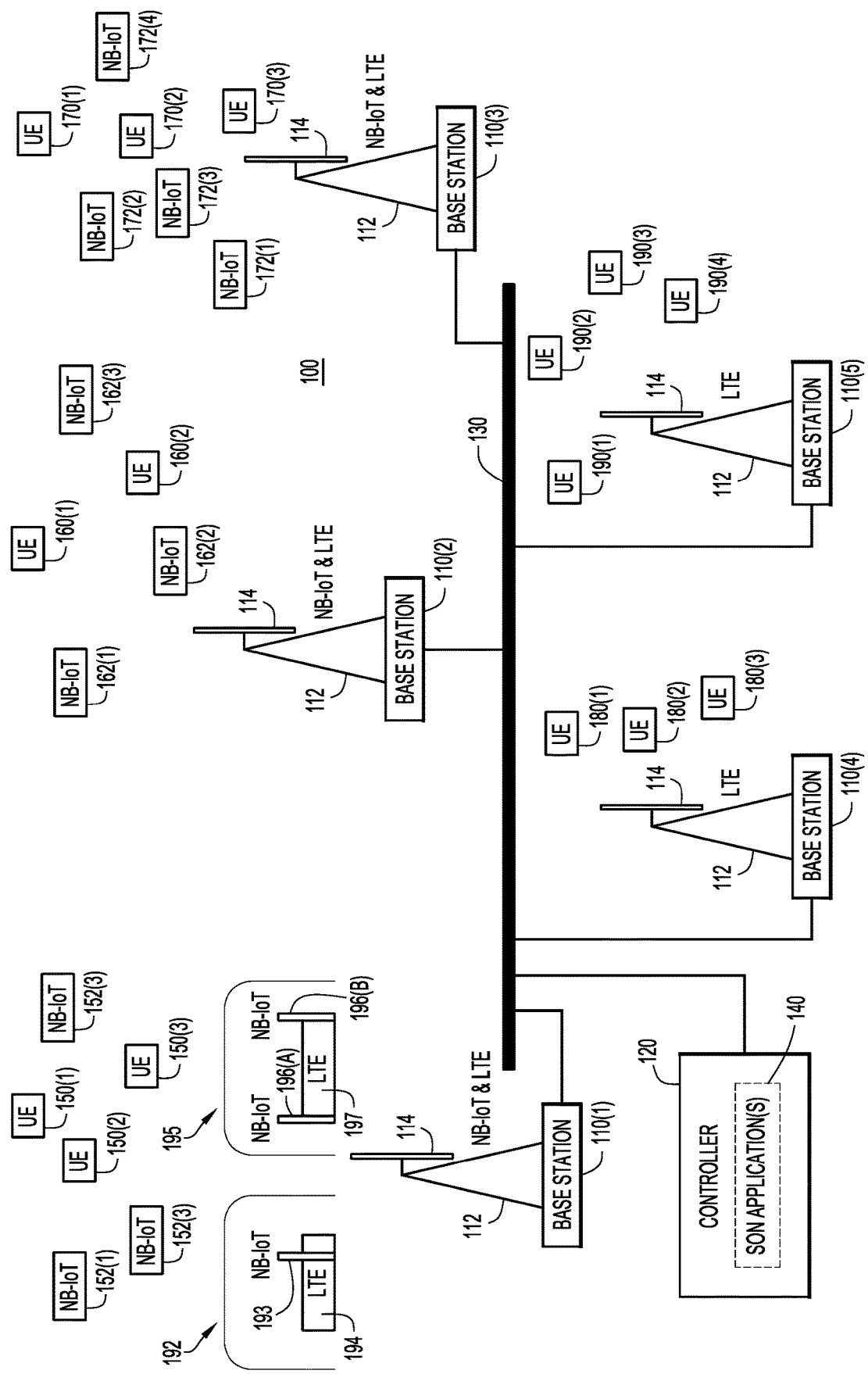
FIG. 1 is a diagram illustrating a wireless network in which self-optimizing networking (SON) applications are employed that take into account NB-IoT devices in the wireless network, according to an example embodiment.

Reference is first made to FIG. 1. FIG. 1 shows a wireless network 100 that includes a plurality of base stations 110(1), 110(2), 110(3), 110(4) and 110(5) and a controller 120 that is communication by way of a network 130 with the plurality of base stations 110(1)-110(5). Each base station includes a tower 112 of some sort and an antenna assembly 114. The antenna assembly 114 may include a single antenna or an antenna array, but for simplicity is shown as a single antenna in FIG. 1. The antenna assembly 114 may be tilted downwards to reduce coverage area of the base station or upwards to increase coverage area of the base station. The transmit power of the base station may also be increased to increase coverage area, and reduced to reduce coverage area.

The controller 120 executes one or more SON applications 140 to control the base stations 110(1)-110(5). It is to be understood and appreciated by those with ordinary skill in the art that the wireless network 100 may include numerous more base stations, and that FIG. 1 is simplified for purposes of describing the embodiments herein.

In the example of FIG. 1, some of the base stations serve only a cell of the aforementioned first type (e.g., LTE) while other base stations serve both a cell of the first type and a cell of a second type (NB-IoT). For example, as indicated in FIG. 1, base station 110(1) serves an LTE cell and a NB-IoT cell, base station 110(2) serves an LTE cell and a NB-IoT cell, base station 110(3) serves an LTE cell and a NB-IoT cell, base station 110(4) serves only an LTE cell and base station 110(5) serves only an LTE cell. Thus, as shown in FIG. 1, base station 110(1) serves UE devices 150(1), 150(2) and 150(3) as well as NB-IoT devices 152(1), 152(2) and 152(3). Similarly, base station 110(2) serves UE devices 160(1) and 160(2) and NB-IoT devices 162(1), 162(2) and 162(3). Base station 110(3) serves UE devices 170(1)-170(3) as well as NB-IoT devices 172(1)-172(4). Base station 110(4) serves UE devices 180(1)-180(3) and base station 110(6) serves UE devices 190(1)-190(4).

Also, as shown in FIG. 1, when a base station, such as base station 110(1), serves a NB-IoT cell, it may do this using the In-band approach shown at 192 where a resource block 193 is used for NB-IoT traffic within the spectrum 194 of an LTE band, or the Guard-band approach shown at 195 in which unused source blocks are used for NB-IoT traffic within the guard-bands 196A and 196B of the spectrum 197 of an LTE band. Base stations 110(2) and 110(3) may serve a NB-IoT in a similar manner using the In-band approach or Guard-band approach.

As explained above, the embodiments presented herein relate to modifying SON applications applied by controller 120 in the presence of NB-IoT in the wireless network 100. There are many types of SON applications. The following refers to the use of cell shaping (antenna tilting) and Physical Cell Identifier (PCI) plan optimization as non-limited examples of SON applications.

Figure 2:
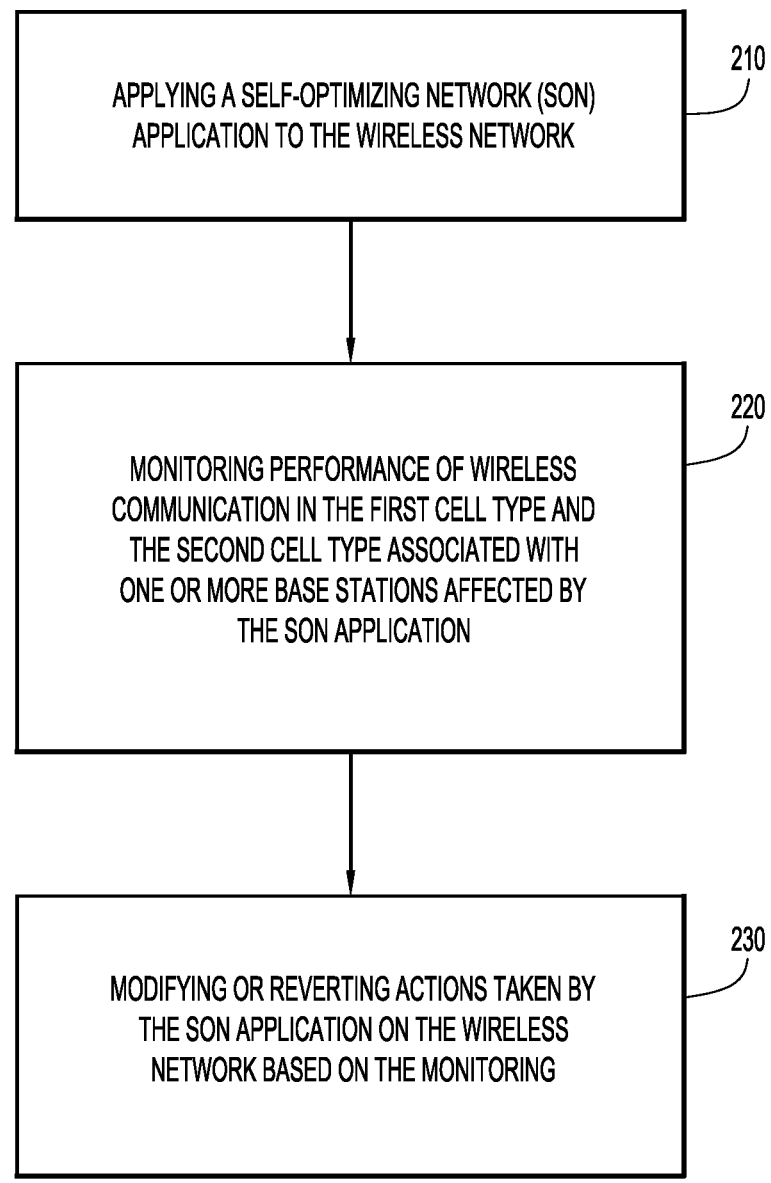
FIG. 2 is a high-level flow chart of a process for adapting SON applications based on the presence of NB-IoT cells in the wireless network, according to an example embodiment.

Reference is now made to FIG. 2. FIG. 2 shows a high-level flow chart of a process 200 according to the example embodiments presented herein. The process 200 is performed by, for example, the controller 120 shown in FIG. 1, that controls a wireless network that includes a plurality of base stations, at least one of the base stations serving wireless communication for both a first cell type of wireless user devices and a second cell type of narrowband Internet of Things (IoT) devices. At 210, the controller applies a SON application to the wireless network. At 220, the controller monitors performance of wireless communication in the first cell type and the second cell type associated with one or more base stations affected by the SON application. Operation 220 is referred to as a performance monitoring phase. At 230, the controller modifies or reverts actions taken by the SON application on the wireless network based on the monitoring.

The process 200 may further include evaluating performance changes in the first cell type and performance changes in the second cell type. The modifying or reverting operation 230 may be based on an outcome of the evaluating operation.

RF Shaping SON Applications

There are several SON applications that perform actions primarily by RF shaping, which can be done either by increasing or reducing the base station transmission power and/or by tilting a base station's antenna assembly up or down. As NB-IoT cells in In-band and Guard-band deployments are anchored on parent LTE cells and share the transmitter and antennas of the same base station, antenna tilt or transmission power changes imposed by SON on LTE cells also affect child NB-IoT cell performance and coverage. Antenna tilting is an example of RF shaping and it should be understood that the techniques presented herein encompass the use of any other RF shaping technique (such as transmission power increase or decrease) now known or hereinafter developed.

Dynamic Self-Healing (DSH) is a process that compensates for cells that go out-of-service by covering the coverage area of an out-of-service base station with a base station of a neighboring cell. In other words, the coverage area of one or more neighboring cells is increased by increasing power or by uptilting the antenna assembly of the base station. Increasing the coverage area of that base station's children NB-IoT cells may cause undesired effects, such as interference to neighboring NB-IoT cells.

Accordingly, as part of the DSH process, the controller 120 checks whether a particular base station that has gone out-of-service has a child NB-IoT cell. If the particular base station does serve an NB-IoT cell, then the child NB-IoT cell has gone out-of-service along with its parent LTE cell. In that case, the controller 120 will give preference to performing coverage area increase actions on base stations that also serve an NB-IoT cell, so that the NB-IoT cell will also benefit from DSH's actions.

If the particular base station that went out-of-service does not serve an NB-IoT cell, the preference is the opposite and the controller will give preference to base stations that do not serve NB-IoT cells for antenna uptilt action. When an action is taken at a base station that serves an NB-IoT cell, performance in that NB-IoT cell and any neighboring NB-IoT cells will monitored along with the performance in the existing LTE cell to determine whether to modify or revert the SON action. Examples of performance indicators that may be monitored to determine whether to modify or revert the SON action include one or more of: decrease in the number of NB-IoT radio resource control (RRC) connections, decrease in NB-IoT data volume, decrease in RRC connection establishment success rate, increase in NB-IoT radio link failures, and NB-IoT missing hybrid automatic repeat request (HARD) feedback. The controller 120 may use a setting selected by a network administrator to weigh NB-IoT performance feedback against the LTE performance feedback, in order to make a final decision as to whether to modify or revert the action.

Figure 3:
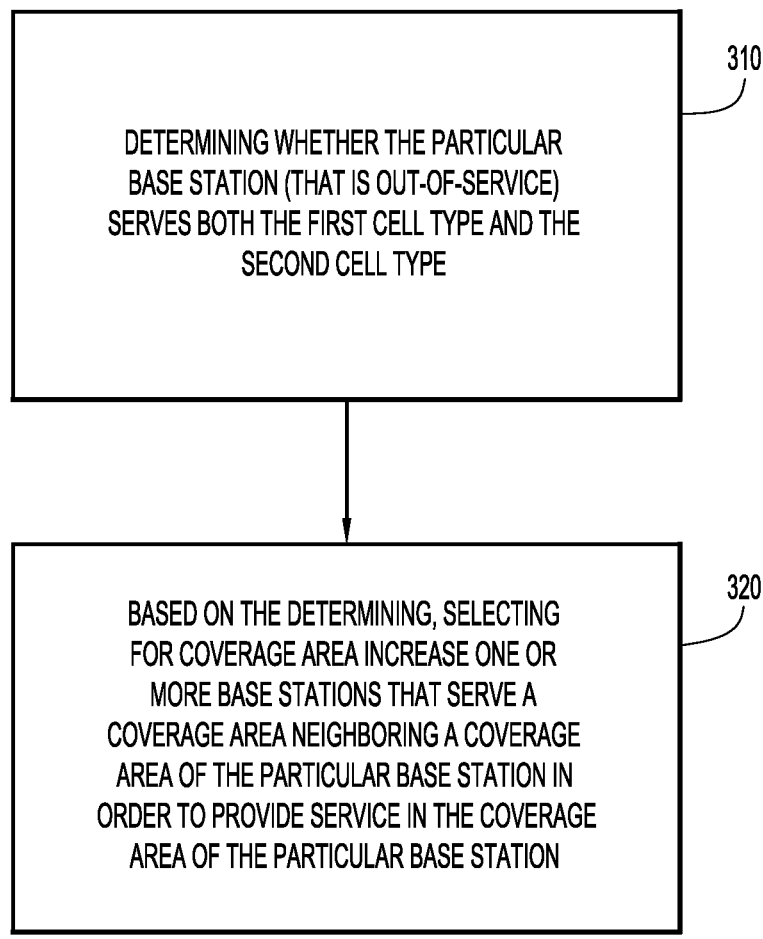
FIG. 3 is a flow chart of a process for adapting a Dynamic Self-Healing SON application when a base station is out-of-service, according to an example embodiment.

Reference is now made to FIG. 3 for a description of a process 300. Reference is also made to FIG. 1 in connection with the description of the process 300. The controller 120 performs process 300 when the SON application is Dynamic Self-Healing that includes increasing the coverage area of one or more of a plurality of base stations when a particular base station (of the plurality of base stations) has gone out-of-service in order to provide service in a coverage area of the particular base station. For example, base station 110(2) in FIG. 1 is out-of-service. At 310, the controller determines whether the particular base station serves both the first cell type (e.g., LTE) and the second cell type (NB-IoT). At 320, based on the outcome of the determination made at operation 310, the controller selects for coverage area increase one or more base stations that serve a coverage area neighboring a coverage area of the particular base station in order to provide service in the coverage area of the particular base station. More specifically, when the controller determines that the particular base station serves both the first cell type and the second cell type, the selecting operation 320 involves selecting a base station of the plurality of base stations that also serves both the first cell type and the second cell type. Conversely, when the controller 120 determines that the particular base station does not serve the second cell type (NB-IoT), the selecting operation 320 involves selecting a base station that does not serve both the first cell type and the second cell type.

In the example of FIG. 1, since base station 110(2) is out-of-service, and the controller 120 will determine that base station 110(2) serves both LTE and NB-IoT cells, the controller 120 will select a neighboring base station that also serves both LTE and NB-IoT cells. In this example, the controller 120 may select base station 110(1) because it serves a neighboring coverage area and also serves both LTE and NB-IoT cells. The controller 120 will select base station 110(1) for coverage area increase in order to provide coverage for the coverage area of base station 110(2). The controller 120 could have also selected base station 110(3) for antenna uptilting.

As described above, after the SON action is applied, the controller 120 will monitor in the second cell type (NB-IoT cell) of the base station selected for coverage area increase, one or more of: number of radio resource control NB-IoT connections, NB-IoT data volume, NB-IoT radio resource connection establishment success rate, NB-IoT radio link failures, and NB-IoT missing hybrid automatic repeat requests.

Coverage-Interference-Capacity Optimization (CICO) is an RF Shaping SON application that handles overshooters and undershooters by decreasing or increasing their coverage area, respectively, by antenna tilting, transmit power adjustment, etc. An overshooter is a base station that causes extensive interference to its surrounding area, well beyond its intended coverage area. An undershooter is a base station that does not cover its intended coverage area.

If an overshooter base station serves an NB-IoT cell, the controller SON will make a particular evaluation when checking the overshooter base station for a SON action. The controller checks the LTE cells currently affected by the overshooter base station for child NB-IoT cells. If those LTE cells, too, have children NB-IoT cells, they will be monitored for NB-IoT performance during the feedback/performance monitoring phase stage, as well as NB-IoT cell associated with the overshooter base station, according to the performance indicators listed above. Performance feedback of the LTE cell(s) will also account for interference from NB-IoT on the LTE cells.

If neighboring cells of the overshooter base station do not have children NB-IoT cells, downtilting the overshooter may cause NB-IoT coverage holes. In this situation, the performance monitoring phase will check for performance indicators, such as reduction of NB-IoT RRC connections, NB-IoT data volume, and RRC connection establishment success rate. The controller 120 may use a setting selected by a network administrator to weigh NB-IoT performance feedback against the LTE performance feedback, in order to make a final decision as whether to modify or revert the action.

When increasing the coverage area of an undershooter base station, the controller will check the undershooter base station to determine if it serves an NB-IoT cell. Due to the deep coverage characteristics of NB-IoT, there is potential for an increase in interference caused by that undershooter base station after the coverage increase. The performance feedback phase checks the neighboring LTE cells for performance degradation, and in addition, checks for potential performance degradation of the children NB-IoT cells of those neighboring LTE cells according to the performance indicators listed above. The controller 120 may use a setting selected by a network administrator to weigh NB-IoT performance feedback against the LTE performance feedback, in order to make a final decision as to whether to modify or revert the action.

Figure 4:
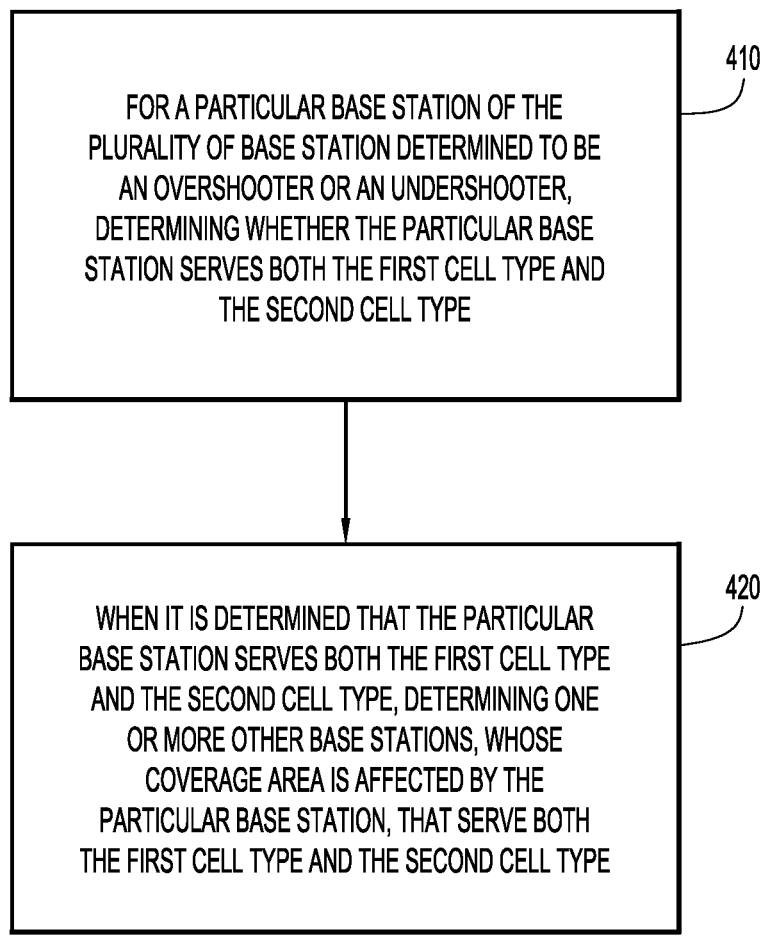
FIG. 4 is a flow chart of a process for adapting a Coverage-Interference-Capacity Optimization (CICO) SON application that handles overshooter and undershooter base stations, according to an example embodiment.

Reference is now made to FIG. 4. FIG. 4 illustrates a flow chart for a process 400 for the situation where the SON application is CICO to address an overshooter base station by coverage area decrease or an undershooter base station by coverage area increase. At 410, the controller determines, for a particular base station of the plurality of base station determined to be an overshooter or an undershooter, whether the particular base station serves both the first cell type (LTE) and the second cell type (NB-IoT). At 420, when the controller determines that the particular base station serves both the first cell type and the second cell type, the controller then determines one or more other base stations, whose coverage area is affected by the particular base station, that serve both the first cell type and the second cell type.

The controller monitors performance of wireless communication associated with the one or more other base stations, regardless of whether they serve NB-IoT cells. Specifically, the controller also monitors performance in the second cell type (NB-IoT) cell associated with the particular base station (the overshooter or undershooter) and the one or more other base stations, including one or more of: number of NB-IoT radio resource control connections, NB-IoT data volume, NB-IoT radio resource connection establishment success rate, NB-IoT radio link failures, and NB-IoT missing hybrid automatic repeat request feedback. When the controller determines that the one or more other base stations, whose coverage area is affected by the particular base station, do not serve the second cell type, the controller monitors for reduction in performance in the second cell type of the particular base station.

Figure 5A:
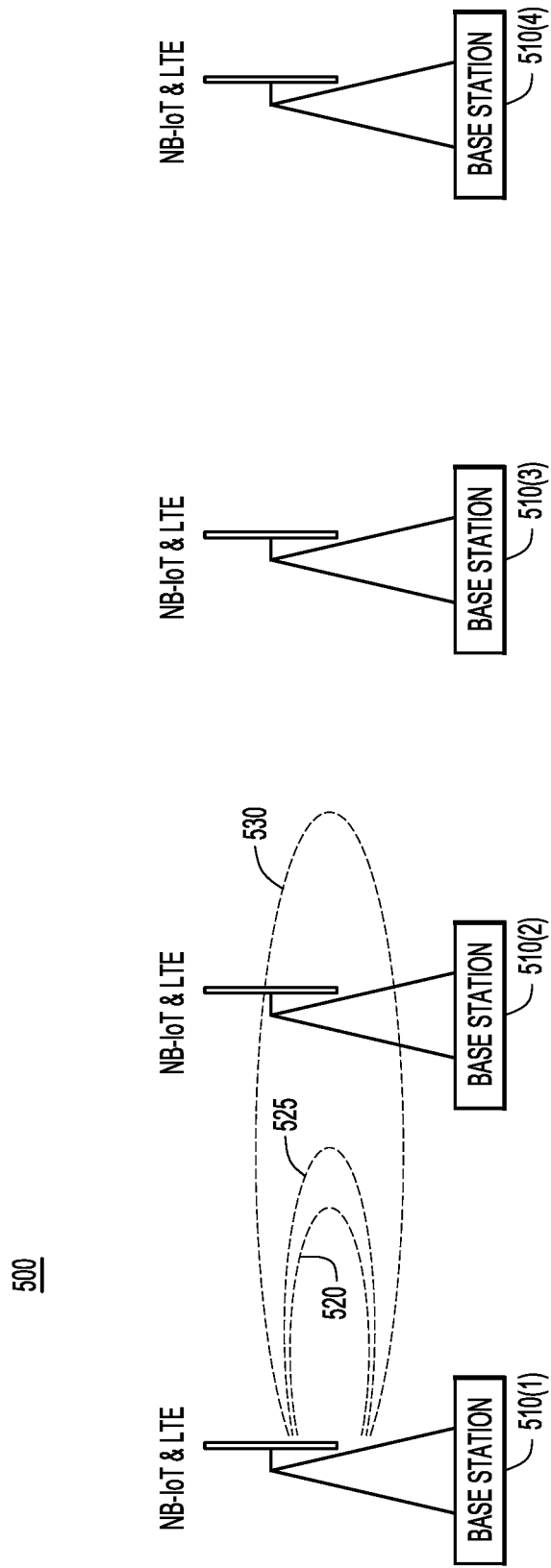
FIGS. 5A and 5B are diagrams illustrating a scenario in for adapting a CICO SON application for an undershooter base station, according to an example embodiment.
Figure 5B:
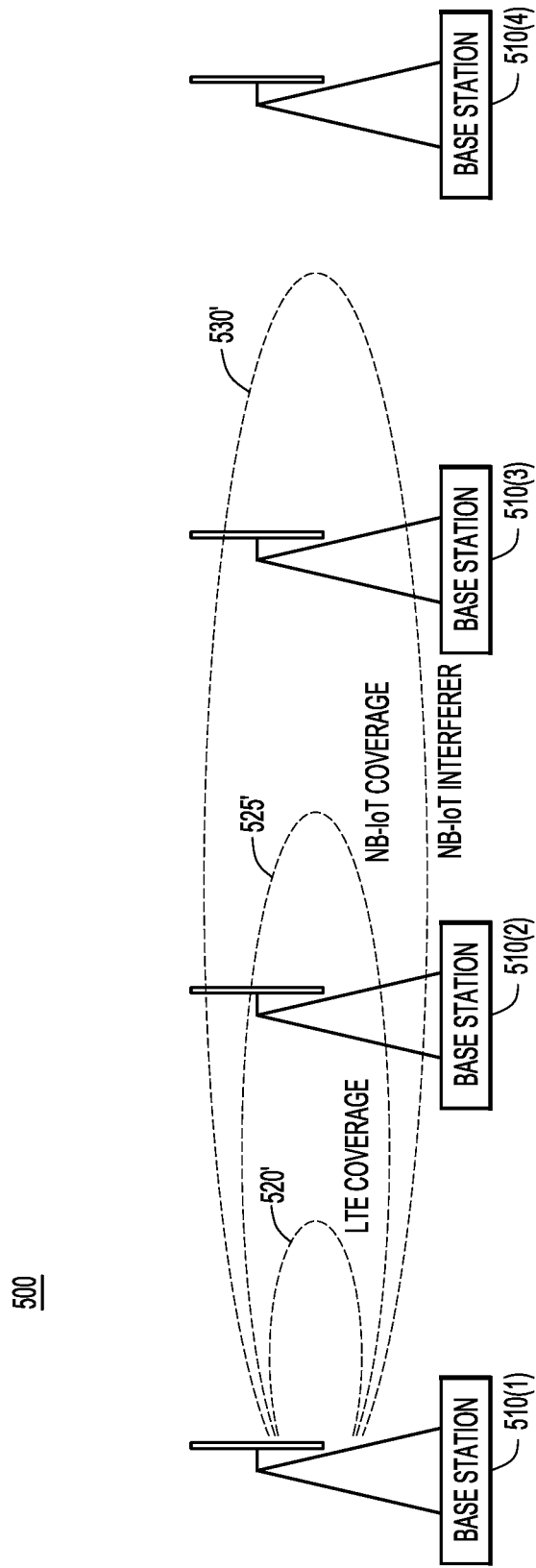

Reference is now made to FIGS. 5A and 5B, which illustrate an example of applying a SON application to address a base station (that serves an LTE cell and NB-IoT cell) that is an undershooter. FIG. 5A shows a wireless network 500 that includes four base stations 510(1), 510(2), 510(3) and 510(4). All of the base stations 510(1)-510(4) serve an LTE cell and a NB-IoT cell. In FIG. 5, base station 510(1) is an undershooter because it is not properly covering its intended coverage area. The LTE coverage area of the base station 510(1) is shown at 520. The coverage of the NB-IoT cell of base station 510(1) is shown at 525. The area of influence of the NB-IoT cell of base station 510(1) is shown at 530, in which it serves as an interferer with respect to base station 510(2) as illustrated in FIG. 5A.

FIG. 5B illustrates how the coverage area of base station 510(1) is increased by RF shaping (for example, antenna uptilt or transmission power increase). The new coverage area for the LTE cell is shown at 520', the new NB-IoT coverage area is shown at 525' and the area of influence of the NB-IoT cell as an interferer is shown at 530'. Increasing the coverage area of base station 510(1) causes the NB-IoT coverage to be much farther than intended, causing unplanned interference not just to base station 510(2) but also to base station 510(3). Thus, the process 400 depicted in FIG. 4 can be used to prevent the type of undesired effects of applying an RF Shaping SON application to a base station that is operating as an undershooter when that base station serves a NB-IoT cell.

As explained above, after performing a SON action, the controller again checks NB-IoT performance (as well as LTE performance) to determine whether the action improved or at least did not do more harm. If the controller determines that the action caused degradation (to LTE cell or NB-IoT cell performance), it reverts the action to the previous/baseline state. Otherwise, if the controller determines that the action does not cause any degradation (to LTE cell or NB-IoT cell performance), the controller keeps that action/commits it and move on to determine if there is another action that can be taken.

Again, there could be a situation where a change positively affects LTE performance but negatively affects NB-IoT performance. The SON application has configurations that account for this, and as long the performance is still within an acceptable range set according to a policy in set by in the controller, the change to the network will be maintained. If there is a degradation (in LTE or NB-IoT performance) outside the acceptable range, then the controller will not commit that change.

Physical Cell Identifier (PCI) Plan Optimization

PCIs in LTE networks provide a pseudo-unique value for identifying base stations. The PCI value is created from two components: Primary Synchronization Signal (PSS) and Secondary Synchronization Signal (SSS). The PSS has the value 0, 1, or 2. The SSS can have a value between 0 and 167. The resulting combination produces 504 possible values for PCI.

NB-IoT cells, in all deployment types, also have PCIs. When deployed In-band or Guard-band, system operators may mandate that the PCI of a NB-IoT cell be inter-dependent with that of its parent LTE cell, e.g., be the same, sustain some mathematical connection, or any other dependency; or allow it to be set independently, depending on their policy and system capabilities.

Currently, SON optimizes PCI of LTE cells to eliminate PCI collisions between first- and second-degree neighboring cells, and possibly minimize third-degree collisions as well. An optimal PCI plan in a LTE network is aided by checking Key Performance Indicators (KPIs) on connected mode mobility, e.g. handover attempt and success figures between a source cell and its neighboring cells.

NB-IoT connected mode mobility is not supported and such KPIs do not exist for NB-IoT cells. Therefore, when a NB-IoT cell is deployed In-band or Guard-band, the determining the optimal PCI for a NB-IoT cell would be aided by using the mobility KPIs of its parent LTE cell and removing from the KPI statistics of LTE cells that do not have child NB-IoT cells. The remaining list would be the KPI statistics of mobility between LTE cells which have child NB-IoT cells, and the PCI planning algorithm will be running on that (potentially reduced) list.

The controller checks for parent LTE cells that do not have children NB-IoT cells and removes them from its calculation of neighboring relation degree. That is, a second-degree relation of LTE cells (neighbor of a neighbor) may be counted as a first-degree relation for NB-IoT PCI plan purposes when the cell between two NB-IoT cells does not have a child NB-IoT cell. When PCIs of a parent LTE cell and of its child NB-IoT cell are mandated to be inter-dependent, the controller will consider the neighbor relation degree limitations of both cell types when determining their inter-dependent PCIs. When PCIs of the parent LTE cell and its child NB-IoT cell are allowed to be independent PCIs, NB-IoT PCI optimization will then be conducted independently of LTE PCI optimization. During the performance monitoring feedback phase, the controller will also check NB-IoT cell performance, with special emphasis on RRC connection establishment success rate, to determine whether to commit or revert the action.

Figure 6:
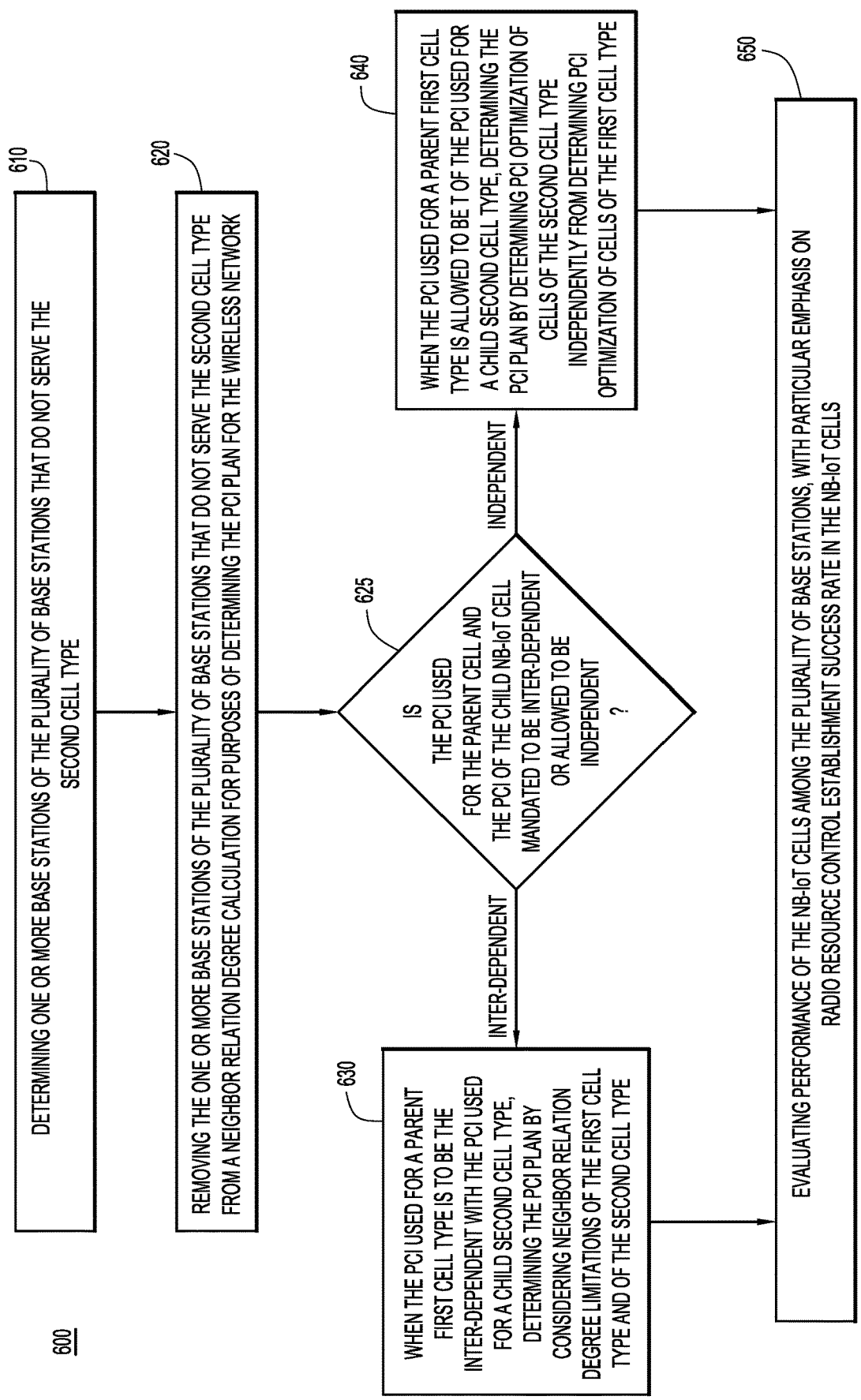
FIG. 6 is a flow chart of a process for adapting a Physical Cell Identifier (PCI) plan based on one or more NB-IoT cells in the wireless network, according to an example embodiment.

Reference is now made to FIG. 6 that shows a flow chart of a process 600 for accounting for NB-IoT cells in PCI plan optimization. At 610, the controller determines one or more base stations of a plurality of base stations that do not serve the second cell type. At 620, the controller removes the one or more base stations of the plurality of base stations that do not serve the second cell type from a neighbor relation degree calculation for purposes of determining the PCI plan for the wireless network. At 625, the controller determines whether the PCI used for a parent LTE cell and the child NB-IoT cell (first cell type and second cell type of a given base station) is mandated to be inter-dependent, or allowed to be independent.

At 630, when the PCI used for a parent first cell type is mandated to be inter-dependent with the PCI used for a child second cell type, the controller determines the PCI plan by considering neighbor relation degree limitations of the first cell type and of the second cell type. In other words, a second-degree relation of LTE cells (neighbor of a neighbor) may be counted as a first-degree relation for NB-IoT PCI plan purposes when the cell between two NB-IoT cells does not have a child NB-IoT cell. At 640, when the PCI used for a parent first cell type is allowed to be independent of the PCI used for a child second cell type, the controller determines the PCI plan by determining PCI optimization of cells of the second cell type independently from determining PCI optimization of cells of the first cell type. The term "parent first cell type" refers to a first cell type (e.g., LTE cell) of a given base station and the term "child second cell type" refers to a second cell type (e.g., NB-IoT cell) of that given base station. In other words, the parent first cell type and the child second cell type share the same base station resources.

At 650, the process includes evaluating performance of the second cell type among the plurality of base stations, with particular emphasis on radio resource control establishment success rate in the second cell type (NB-IoT cells).

Figure 7:
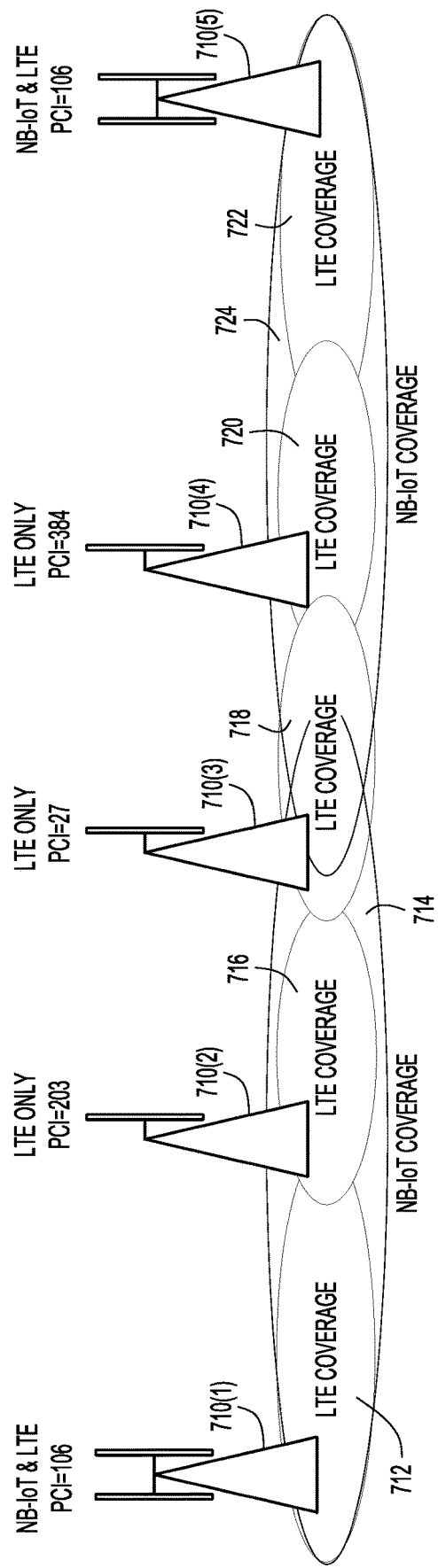
FIG. 7 is a diagram illustrating an example of adapting a PCI plan base on one or more NB-IoT cells in the wireless network, according to an example embodiment.

Reference is now made to FIG. 7. FIG. 7 shows an example of a PCI plan optimization in a wireless network 700 that includes one or more base stations serve child NB-IoT cells. Specifically, the wireless network 700 includes base stations 710(1), 710(2), 710(3), 710(4) and 710(5). The two base stations 710(1) and 710(5) serve LTE cells and NB-IoT cells. The intervening base stations 710(2), 710(3) and 710(4) serve only LTE cells. The LTE coverage of base station 710(1) is shown at 712 and the NB-IoT coverage of base station 710(1) is shown at 714. The LTE coverage of base station 710(2) is shown at 716, the LTE coverage of base station 710(3) is shown at 718, and the LTE coverage of base station 710(4) is shown at 720. The LTE coverage of base station 710(5) is shown at 722 and the NB-IoT coverage of base station 710(5) is shown at 724.

The controller establishes a PCI plan in which the two base stations 710(1) and 710(5) that have NB-IoT children cells have the same PCI (PCI=106), and these base stations serve coverage areas that are bordering an area without NB-IoT cells. From an LTE cell perspective, there are three LTE cells between base stations 710(1) and 710(5), so they are not neighbors, and they are also not common neighbors of a third cell in between them. Therefore, setting the LTE cells for base stations 710(1) and 710(5) with the same PCI is not an issue.

However, setting the child NB-IoT cells of base stations 710(1) and 710(5) with the same PCIs, and thus the same PCI between each other, will cause an issue. This is because there is no NB-IoT cell between base stations 710(1) and 710(5), and the extended coverage of NB-IoT also causes them to overlap, as shown in FIG. 7. Thus, when considering the PCI plan from a NB-IoT perspective, the NB-IoT cells of base stations 710(1) and 710(5) will be considered immediate neighbors, and therefore, the controller will not permit base stations 710(1) and 710(5) to have the same PCIs in the example wireless network shown in FIG. 7.

Figure 8:
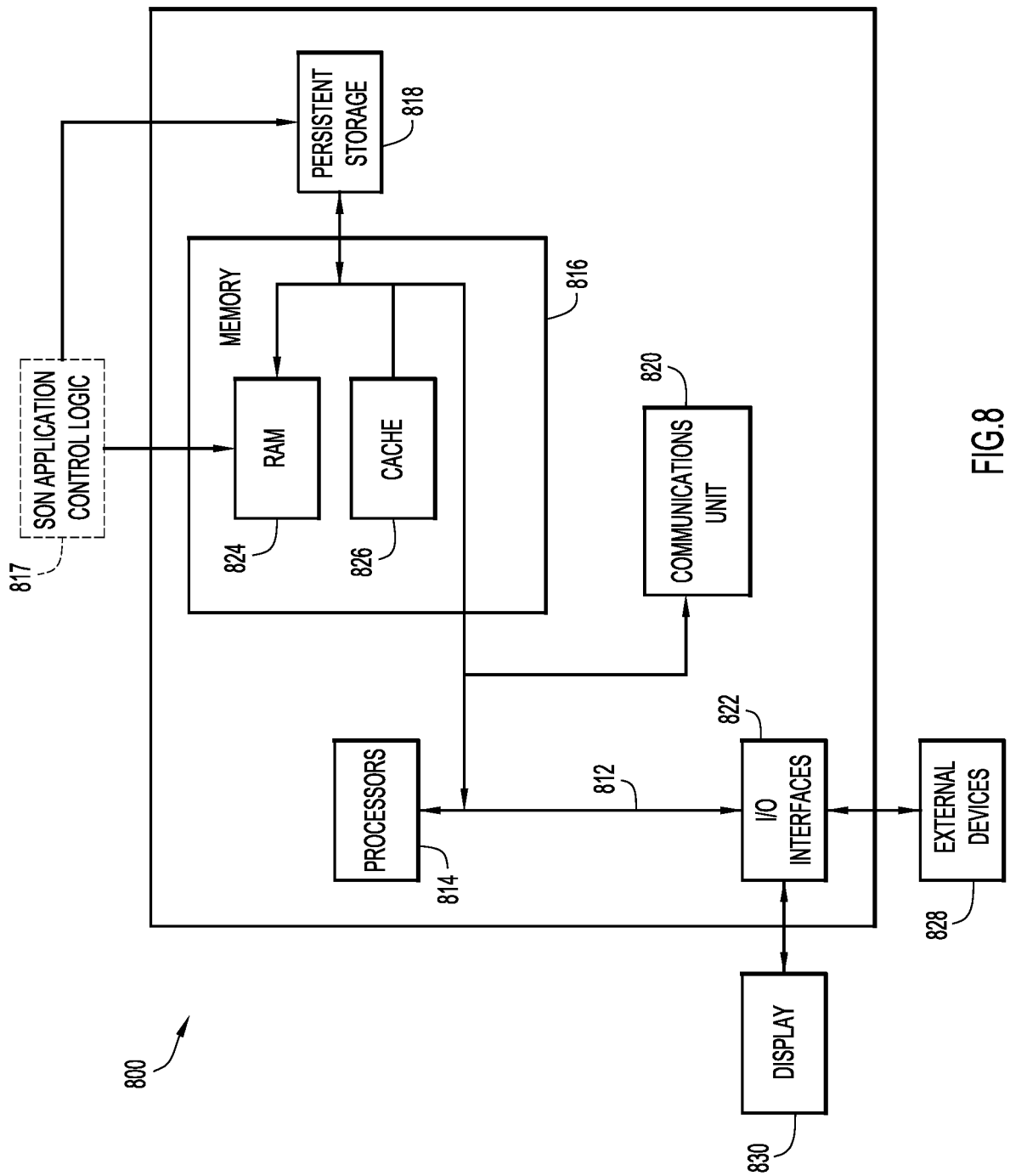
FIG. 8 is a block diagram of a network controller in which the operations for identification and isolation of IoT devices in the enterprise network may be implemented, according to an example embodiment.

FIG. 8 illustrates a hardware block diagram of a computing device 800 that may perform the functions of the controller, such as controller 120 shown in FIG. 1, that controls the base stations 110(1)-110(5) a wireless network 100. It should be appreciated that FIG. 8 provides only an illustration of one embodiment and does not imply any limitations with regard to the environments in which different embodiments may be implemented. Many modifications to the depicted environment may be made.

As depicted, the computing device 800 includes a bus 812, which provides communications between processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 724 and cache memory 826. In general, memory 816 can include any suitable volatile or non-volatile computer readable storage media. Instructions for the SON Application Control Logic 817 may be stored in memory 816 or persistent storage 818 for execution by processor(s) 814.

One or more programs may be stored in persistent storage 818 for execution by one or more of the respective processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links.

I/O interface(s) 822 allows for input and output of data with other devices that may be connected to computer device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Figure 9:
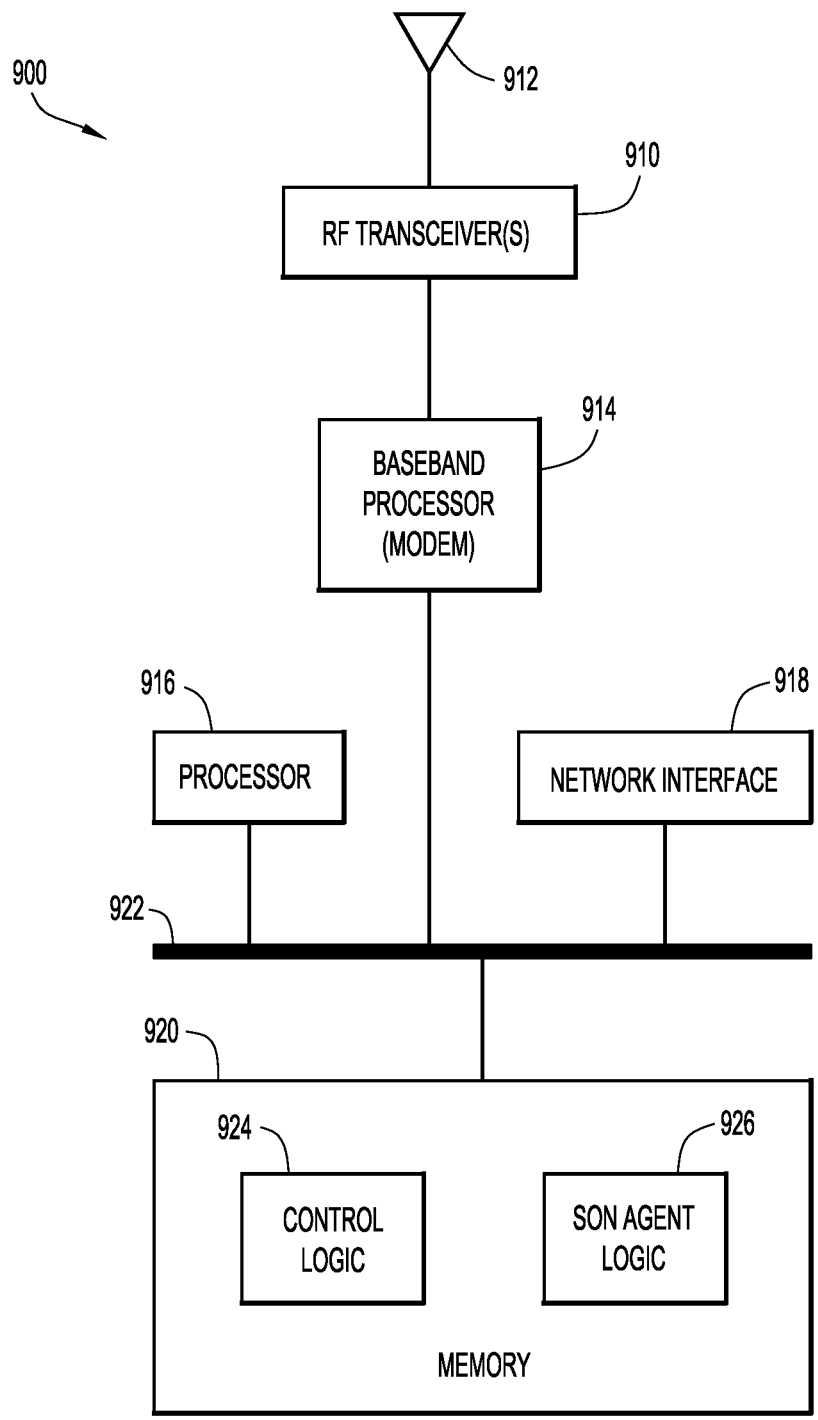
FIG. 9 is a block diagram of a base station that is configured to participate in the SON adaptation techniques, according to an example embodiment.

Reference is now made to FIG. 9. FIG. 9 illustrates a block diagram of a base station 900 that may form a part of a wireless network and thus participate in the techniques presented herein. The base station 900 may serve as any of the base stations referred to in connection with FIGS. 1-7. The base station 900 includes one or more radio frequency (RF) transceiver(s) 910, one or more antennas or antenna arrays 912, a baseband processor or modem 914, a processor 916, a network interface 918 and memory 920 and a bus 922. The RF transceiver(s) perform the RF transmission and RF reception of wireless signals, and the baseband processor (modem) 914 performs baseband modulation and demodulation, etc. The network interface 918 enables wired network communication, e.g., with the controller 120. The memory 920 may take any of the forms of the memory referred to above in connection with FIG. 8.

The processor 916 executes instructions stored in memory 920 to control the base station 900. For example, the memory 920 stores general base station control logic 924 and SON agent logic 926. The SON agent logic 926 executes commands from the controller 120 to execute SON related operations at the base station 900.

In summary, the addition of NB-IoT to LTE systems presents new aspects and risks to cause network performance degradation, which SON can address with new self-optimizing SON applications. NB-IoT also has different coverage characteristics than LTE. NB-IoT is designed for deep coverage, with a maximum coupling loss (MCL) that can exceed that of LTE by more than 20 dB. For these reasons, NB-IoT and LTE mutually influence each other. Existing SON applications for LTE should be made aware of that mutual influence in order to make correct optimization decisions. The embodiments presented herein provide ways for SON to adapt to the presence of NB-IoT with In-band or Guard-band deployment, and the mutual influence between NB-IoT and LTE.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided comprising: at a controller for a wireless network that includes a plurality of base stations, at least one of the base stations serving wireless communication for both a first cell type of wireless user devices and a second cell type of narrowband Internet of Things (IoT) devices: applying a self-optimizing network (SON) application to the wireless network; monitoring performance of wireless communication in the first cell type and the second cell type associated with one or more base stations affected by the SON application; and modifying or reverting actions taken by the SON application on the wireless network based on the monitoring.

As explained above, the method may further include: evaluating performance changes in the first cell type and performance changes in the second cell type; and wherein the modifying or reverting is based the evaluating.

The SON application may include Radio Frequency (RF) shaping of one or more of the plurality of base stations. When the SON application is dynamic self-healing that includes increasing a coverage area of one or more of the plurality of base stations when a particular base station of the plurality of base stations has gone out-of-service in order to provide service in a coverage area of the particular base station, the method further comprises: determining whether the particular base station serves both the first cell type and the second cell type; and based on the determining, selecting for coverage area increase of one or more base stations that serve a coverage area neighboring a coverage area of the particular base station in order provide service in the coverage area of the particular base station. When it is determined that the particular base station serves both the first cell type and the second cell type, the selecting for coverage area increase comprises selecting a base station of the plurality of base stations that also serves both the first cell type and the second cell type. The monitoring operation may include monitoring in the second cell type of the base station selected for coverage area increase, one or more of: number of radio resource control connections, data volume, radio resource connection establishment success rate, radio link failures, and missing hybrid automatic repeat request feedback. When it is determined that the particular base station does not serve the second cell type, the selecting for coverage area increase comprises selecting a base station that does not serve both the first cell type and the second cell type.

When the SON application is coverage-interference-capacity optimization to address an overshooter base station by coverage area decrease and an undershooter base station by coverage area increase, the method further comprises: for a particular base station of the plurality of base station determined to be an overshooter or an undershooter, determining whether the particular base station serves both the first cell type and the second cell type; and when it is determined that the particular base station serves both the first cell type and the second cell type, determining one or more other base stations, whose coverage area is affected by the particular base station, that serve both the first cell type and the second cell type; and wherein monitoring comprises monitoring performance of wireless communication associated with the one or more other base stations. The monitoring operation may include monitoring in the second cell type of the particular base station and the one or more other base stations, one or more of: number of radio resource control connections, data volume, radio resource connection establishment success rate, radio link failures, and missing hybrid automatic repeat request feedback. When it is determined that the one or more other base stations, whose coverage area is affected by the particular base station, do not serve the second cell type, the monitoring operation may include monitoring for reduction in performance in the second cell type of the particular base station.

In another form, the SON application includes determining a Physical Cell Identifier (PCI) plan for the wireless network. In this case, the method further includes: determining one or more base stations of the plurality of base stations that do not serve the second cell type; and removing the one or more base stations of the plurality of base stations that do not serve the second cell type from a neighbor relation degree calculation for purposes of determining the PCI plan for the wireless network. When the PCI used for a parent first cell type is to be the inter-dependent with the PCI used for a child second cell type, the method further comprises determining the PCI plan by considering neighbor relation degree limitations of the first cell type and of the second cell type. When the PCI used for a parent first cell type is allowed to be independent of the PCI used for a child second cell type, the method further includes determining the PCI plan by determining PCI optimization of cells of the second cell type independently from determining PCI optimization of cells of the first cell type. The evaluating operation may include evaluating performance of the second cell type among the plurality of base stations, with particular emphasis on radio resource control establishment success rate in the second cell type.

In another form, one or more non-transitory computer readable storage media are provided encoded with instructions that, when executed by a processor of a controller for a wireless network that includes a plurality of base stations, at least one of the base stations serving wireless communication for both a first cell type of wireless user devices and a second cell type of narrowband Internet of Things (IoT) devices, cause the processor to perform operations including: applying a self-optimizing network (SON) application to the wireless network; monitoring performance of wireless communication in the first cell type and the second cell type associated with one or more base stations affected by the SON application; and modifying or reverting actions taken by the SON application on the wireless network based on the monitoring.

In still another form, an apparatus is provided comprising: a communication interface configured to enable communications with a plurality of base stations in a wireless network, at least one of the base stations serving wireless communication for both a first cell type of wireless user devices and a second cell type of narrowband Internet of Things (IoT) devices; and a processor coupled to the communication interface, wherein the processor is configured to perform operations including: applying a self-optimizing network (SON) application to the wireless network; monitoring performance of wireless communication in the first cell type and the second cell type associated with one or more base stations affected by the SON application; and modifying or reverting actions taken by the SON application on the wireless network based on the monitoring.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a controller for a wireless network that includes a plurality of base stations, at least one of the base stations serving wireless communication for both a first cell type of wireless user devices and a second cell type of narrowband Internet of Things (IoT) devices:
applying a self-optimizing network (SON) application to the wireless network;
monitoring performance of wireless communication in the first cell type and the second cell type associated with one or more base stations affected by the SON application;
evaluating performance changes in the first cell type and performance changes in the second cell type; and
modifying or reverting actions taken by the SON application on the wireless network based on the monitoring and the evaluating, wherein the SON application includes Radio Frequency (RF) shaping of one or more of the plurality of base stations and the SON application is dynamic self-healing that includes increasing a coverage area of one or more of the plurality of base stations when a particular base station of the plurality of base stations has gone out-of-service by determining whether the particular base station serves both the first cell type and the second cell type and, based on the determining, selecting for coverage area increase of one or more base stations that serve a coverage area neighboring a coverage area of the particular base station in order provide service in the coverage area of the particular base station.

2. The method of claim 1, further comprising:
when it is determined that the particular base station serves both the first cell type and the second cell type, the selecting for coverage area increase comprises selecting a base station of the plurality of base stations that also serves both the first cell type and the second cell type.

3. The method of claim 2, wherein monitoring includes monitoring in the second cell type of the base station selected for coverage area increase, one or more of: number of radio resource control connections, data volume, radio resource connection establishment success rate, radio link failures, and missing hybrid automatic repeat request feedback.

4. The method of claim 1, further comprising:
when it is determined that the particular base station does not serve the second cell type, the selecting for coverage area increase comprises selecting a base station that does not serve both the first cell type and the second cell type.

5. The method of claim 1, wherein the SON application includes determining a Physical Cell Identifier (PCI) plan for the wireless network.

6. The method of claim 5, further comprising:
determining one or more base stations of the plurality of base stations that do not serve the second cell type; and
removing the one or more base stations of the plurality of base stations that do not serve the second cell type from a neighbor relation degree calculation for purposes of determining the PCI plan for the wireless network.

7. The method of claim 6, wherein:
when the PCI used for a parent first cell type is to be inter-dependent with the PCI used for a child second cell type, further comprising determining the PCI plan by considering neighbor relation degree limitations of the first cell type and of the second cell type; and
when the PCI used for a parent first cell type is allowed to be independent of the PCI used for a child second cell type, further comprising determining the PCI plan by determining PCI optimization of cells of the second cell type independently from determining PCI optimization of cells of the first cell type.

8. The method of claim 7, wherein the evaluating includes evaluating performance of the second cell type among the plurality of base stations, with particular emphasis on radio resource control establishment success rate in the second cell type.

9. The method of claim 1, wherein the first cell type is a Long Term Evolution (LTE) cell.

10. An apparatus comprising:
a communication interface configured to enable communications with a plurality of base stations in a wireless network, at least one of the base stations serving wireless communication for both a first cell type of wireless user devices and a second cell type of narrowband Internet of Things (IoT) devices; and
a processor coupled to the communication interface, wherein the processor is configured to perform operations including:
applying a self-optimizing network (SON) application to the wireless network;
monitoring performance of wireless communication in the first cell type and the second cell type associated with one or more base stations affected by the SON application;
evaluating performance changes in the first cell type and performance changes in the second cell type; and
modifying or reverting actions taken by the SON application on the wireless network based on the monitoring and the evaluating, wherein the SON application includes Radio Frequency (RF) shaping of one or more of the plurality of base stations and the SON application is dynamic self-healing that includes increasing a coverage area of one or more of the plurality of base stations when a particular base station of the plurality of base stations has gone out-of-service by determining whether the particular base station serves both the first cell type and the second cell type and, based on the determining, selecting for coverage area increase of one or more base stations that serve a coverage area neighboring a coverage area of the particular base station in order provide service in the coverage area of the particular base station.

11. The apparatus of claim 10, wherein the SON application further includes determining a Physical Cell Identifier (PCI) plan for the wireless network.

12. The apparatus of claim 11, wherein the processor is configured to perform operations including:
determining one or more base stations of the plurality of base stations that do not serve the second cell type; and
removing the one or more base stations of the plurality of base stations that do not serve the second cell type from a neighbor relation degree calculation for purposes of determining the PCI plan for the wireless network.

13. The apparatus of claim 12, wherein:
when the PCI used for a parent first cell type is to be inter-dependent with the PCI used for a child second cell type, further comprising determining the PCI plan by considering neighbor relation degree limitations of the first cell type and of the second cell type; and
when the PCI used for a parent first cell type is allowed to be independent of the PCI used for a child second cell type, further comprising determining the PCI plan by determining PCI optimization of cells of the second cell type independently from determining PCI optimization of cells of the first cell type.

14. A method comprising:
at a controller for a wireless network that includes a plurality of base stations, at least one of the base stations serving wireless communication for both a first cell type of wireless user devices and a second cell type of narrowband Internet of Things (IoT) devices:
applying a self-optimizing network (SON) application to the wireless network;
monitoring performance of wireless communication in the first cell type and the second cell type associated with one or more base stations affected by the SON application;
evaluating performance changes in the first cell type and performance changes in the second cell type; and
modifying or reverting actions taken by the SON application on the wireless network based on the monitoring and the evaluating, wherein the SON application includes Radio Frequency (RF) shaping of one or more of the plurality of base stations and provides coverage-interference-capacity optimization to address an overshooter base station by coverage area decrease and an undershooter base station by coverage area increase, and wherein the coverage-interference-capacity optimization comprises:
for a particular base station of the plurality of base stations determined to be an overshooter or an undershooter, determining whether the particular base station serves both the first cell type and the second cell type; and when it is determined that the particular base station serves both the first cell type and the second cell type, determining one or more other base stations, whose coverage area is affected by the particular base station, that serve both the first cell type and the second cell type; and wherein monitoring comprises monitoring performance of wireless communication associated with the one or more other base stations and monitoring in the second cell type of the particular base station and the one or more other base stations, one or more of: number of radio resource control connections, data volume, radio resource connection establishment success rate, radio link failures, and missing hybrid automatic repeat request feedback.

15. The method of claim 14, when it is determined that the one or more other base stations, whose coverage area is affected by the particular base station, do not serve the second cell type, the monitoring includes monitoring for reduction in performance in the second cell type of the particular base station.

16. The method of claim 14, wherein the SON application includes determining a Physical Cell Identifier (PCI) plan for the wireless network.

17. The method of claim 16, further comprising:

determining one or more base stations of the plurality of base stations that do not serve the second cell type; and removing the one or more base stations of the plurality of base stations that do not serve the second cell type from a neighbor relation degree calculation for purposes of determining the PCI plan for the wireless network.

18. The method of claim 17, wherein:

when the PCI used for a parent first cell type is to be inter-dependent with the PCI used for a child second cell type, further comprising determining the PCI plan by considering neighbor relation degree limitations of the first cell type and of the second cell type; and when the PCI used for a parent first cell type is allowed to be independent of the PCI used for a child second cell type, further comprising determining the PCI plan by determining PCI optimization of cells of the second cell type independently from determining PCI optimization of cells of the first cell type.

19. The method of claim 18, wherein the evaluating includes evaluating performance of the second cell type among the plurality of base stations, with particular emphasis on radio resource control establishment success rate in the second cell type.

20. The method of claim 14, wherein the first cell type is a Long Term Evolution (LTE) cell.

* * * * *